United States Patent [19]

Yokota et al.

[11] Patent Number: 5,504,728
[45] Date of Patent: Apr. 2, 1996

[54] METHOD FOR RECORDING OF DISK AND APPARATUS FOR ADJUSTING POSITION OF BREAKPOINT OF AUDIO DATA

[75] Inventors: Teppei Yokota, Chiba; Nobuyuki Kihara, Tokyo; Junichi Aramaki, Chiba, all of Japan

[73] Assignee: Sony Corporation, Tokyo, Japan

[21] Appl. No.: 341,374

[22] Filed: Nov. 17, 1994

Related U.S. Application Data

[62] Division of Ser. No. 154,297, Nov. 18, 1993.

[30] Foreign Application Priority Data

Nov. 18, 1992 [JP] Japan .................................. 4-332328

[51] Int. Cl.⁶ ...................................................... G11B 7/00
[52] U.S. Cl. ............................. 369/58; 369/54; 369/47
[58] Field of Search .................................. 369/54, 53, 58, 369/59, 60, 47, 48, 49, 32, 44.32, 174

[56] References Cited

U.S. PATENT DOCUMENTS

| | | | |
|---|---|---|---|
| 4,764,913 | 8/1988 | Sasaki et al. | 369/49 |
| 5,124,963 | 6/1992 | Ando | 369/58 X |
| 5,187,699 | 2/1993 | Raaymakers et al. | 369/48 |
| 5,224,087 | 6/1993 | Maeda et al. | 369/54 |
| 5,243,588 | 9/1993 | Maeda et al. | 369/54 |
| 5,377,167 | 12/1994 | Maeda et al. | 369/47 |

FOREIGN PATENT DOCUMENTS

| | | | |
|---|---|---|---|
| 0500149A2 | 8/1992 | European Pat. Off. | G11B 20/10 |
| 0544299A2 | 6/1993 | European Pat. Off. | G11B 20/10 |
| 2245750 | 1/1992 | United Kingdom | G11B 27/034 |

*Primary Examiner*—Georgia Y. Epps
*Assistant Examiner*—Muhammad Edun
*Attorney, Agent, or Firm*—Limbach & Limbach; Philip M. Shaw, Jr.

[57] ABSTRACT

A method of performing data compression of audio data and sequentially recording the data on a disk in units of the data, each unit being formed of a predetermined amount of the data. In the method, there is provided a detector for detecting a breakpoint of the audio data. The audio data is continuously recorded by joining, even at the breakpoint, the data preceding and subsequent to the breakpoint, thereby forming the unit data. A piece of information indicating the position of the breakpoint is recorded on the disk. When an operation to suspend or stop the recording operation has been made, the last data immediately before the suspended or stopped point is included in the unit data and recorded as a portion of the unit data. The following data is recorded started from new unit data. When the last recorded data is short of a unit data amount, the remaining portion of the unit data amount is filled with data of a special pattern.

12 Claims, 7 Drawing Sheets

FIG. 3
UTOC SECTOR 0

| | MSB    LSB | MSB    LSB | MSB    LSB | MSB    LSB |
|---|---|---|---|---|
| | d1      d8 | d1      d8 | d1      d8 | d1      d8 |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | clusterH | clusterL | 00000000 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | FirstTNO | Last TNO |
| 8 | 00000000 | 00000000 | 00000000 | Used Sectors |
| 9 | 00000000 | 00000000 | 00000000 | 00000000 |
| 10 | 00000000 | 00000000 | 00000000 | Disc Serial No |
| 11 | DISC | ID | P-DFA | P-EMPTY |
| 12 | P-FRA | P-TNO1 | P-TNO2 | P-TNO3 |
| 13 | P-TNO4 | P-TNO5 | P-TNO6 | P-TNO7 |
| 14 | P-TNO8 | P-TNO9 | P-TNO10 | P-TNO11 |
| 15 | P-TNO12 | P-TNO13 | P-TNO14 | P-TNO15 |
| 16 | P-TNO16 | | | |
| 17 | | | | |
| 73 | | | | |
| 74 | P-TNO248 | P-TNO249 | P-TNO250 | P-TNO251 |
| 75 | P-TNO252 | P-TNO253 | P-TNO254 | P-TNO255 |
| 76 | 00000000 | 00000000 | 00000000 | 00000000 |
| 77 | 00000000 | 00000000 | 00000000 | 00000000 |
| 78 | Start address | | | Track mode |
| 79 | End address | | | Link-P |
| 80 | Start address | | | Track mode |
| 81 | End address | | | Link-P |
| 82 | Start address | | | Track mode |
| 83 | End address | | | Link-P |
| 84 | Start address | | | Track mode |
| 85 | End address | | | Link-P |
| 86 | | | | |
| 481 | | | | |
| 482 | | | | |
| 534 | | | | |
| 535 | | | | |
| 586 | Start address | | | Track mode |
| 587 | End address | | | Link-P |

FIG. 4
UTOC SECTOR 1

| | MSB d1 — LSB d8 | MSB d1 — LSB d8 | MSB d1 — LSB d8 | MSB d1 — LSB d8 |
|---|---|---|---|---|
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | clusterH | clusterL | 00000001 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 14 | P-TNA8 | P-TNA9 | P-TNA10 | P-TNA11 |
| 15 | P-TNA12 | P-TNA13 | P-TNA14 | P-TNA15 |
| 16 | P-TNA16 | | | |
| 17 | | | | |
| 73 | | | | |
| 74 | P-TNA248 | P-TNA249 | P-TNA250 | P-TNA251 |
| 75 | P-TNA252 | P-TNA253 | P-TNA254 | P-TNA255 |
| 76 | Disc name or Track name | | | |
| 77 | Disc name or Track name | | | Link-P |
| 78 | Disc name or Track name | | | |
| 79 | Disc name or Track name | | | Link-P |
| 80 | Disc name or Track name | | | |
| 81 | Disc name or Track name | | | Link-P |
| 82 | Disc name or Track name | | | |
| 83 | Disc name or Track name | | | Link-P |
| 84 | Disc name or Track name | | | |
| 85 | Disc name or Track name | | | Link-P |
| 86 | | | | |
| 481 | | | | |
| 482 | | | | |
| 534 | | | | |
| 535 | | | | |
| 586 | Disc name or Track name | | | |
| 587 | Disc name or Track name | | | Link-P |

FIG. 5
UTOC SECTOR 2

|     | MSB      LSB | MSB      LSB | MSB      LSB | MSB      LSB |
|-----|--------------|--------------|--------------|--------------|
|     | d1        d8 | d1        d8 | d1        d8 | d1        d8 |
| 0   | 00000000 | 11111111 | 11111111 | 11111111 |
| 1   | 11111111 | 11111111 | 11111111 | 11111111 |
| 2   | 11111111 | 11111111 | 11111111 | 00000000 |
| 3   | clusterH | clusterL | 00000010 | 00000010 |
| 4   | 00000000 | 00000000 | 00000000 | 00000000 |
| 5   | 00000000 | 00000000 | 00000000 | 00000000 |
| 6   | 00000000 | 00000000 | 00000000 | 00000000 |
| 7   | 00000000 | 00000000 | 00000000 | 00000000 |
| 8   | 00000000 | 00000000 | 00000000 | 00000000 |
| 9   | 00000000 | 00000000 | 00000000 | 00000000 |
| 10  | 00000000 | 00000000 | 00000000 | 00000000 |
| 11  | 00000000 | 00000000 | 00000000 | P-EMPTY |
| 12  | 00000000 | P-TRD1 | P-TRD2 | P-TRD3 |
| 13  | P-TRD4 | P-TRD5 | P-TRD6 | P-TRD7 |
| 14  | P-TRD8 | P-TRD9 | P-TRD10 | P-TRD11 |
| 15  | P-TRD12 | P-TRD13 | P-TRD14 | P-TRD15 |
| 16  | P-TRD16 |  |  |  |
| 17  |  |  |  |  |
| 73  |  |  |  |  |
| 74  | P-TRD248 | P-TRD249 | P-TRD250 | P-TRD251 |
| 75  | P-TRD252 | P-TRD253 | P-TRD254 | P-TRD255 |
| 76  | Disc rec date and time | | | |
| 77  |  |  | 00000000 | 00000000 |
| 78  | Track rec date and time | | | |
| 79  |  |  | 00000000 | (LINK-P) |
| 80  | Track rec date and time | | | |
| 81  |  |  | 00000000 | (LINK-P) |
| 82  | Track rec date and time | | | |
| 83  |  |  | 00000000 | (LINK-P) |
| 84  | Track rec date and time | | | |
| 85  |  |  | 00000000 | (LINK-P) |
| 86  |  |  |  |  |
| 481 |  |  |  |  |
| 482 |  |  |  |  |
| 534 |  |  |  |  |
| 535 |  |  |  |  |
| 586 | Track rec date and time | | | |
| 587 |  |  | 00000000 | (LINK-P) |

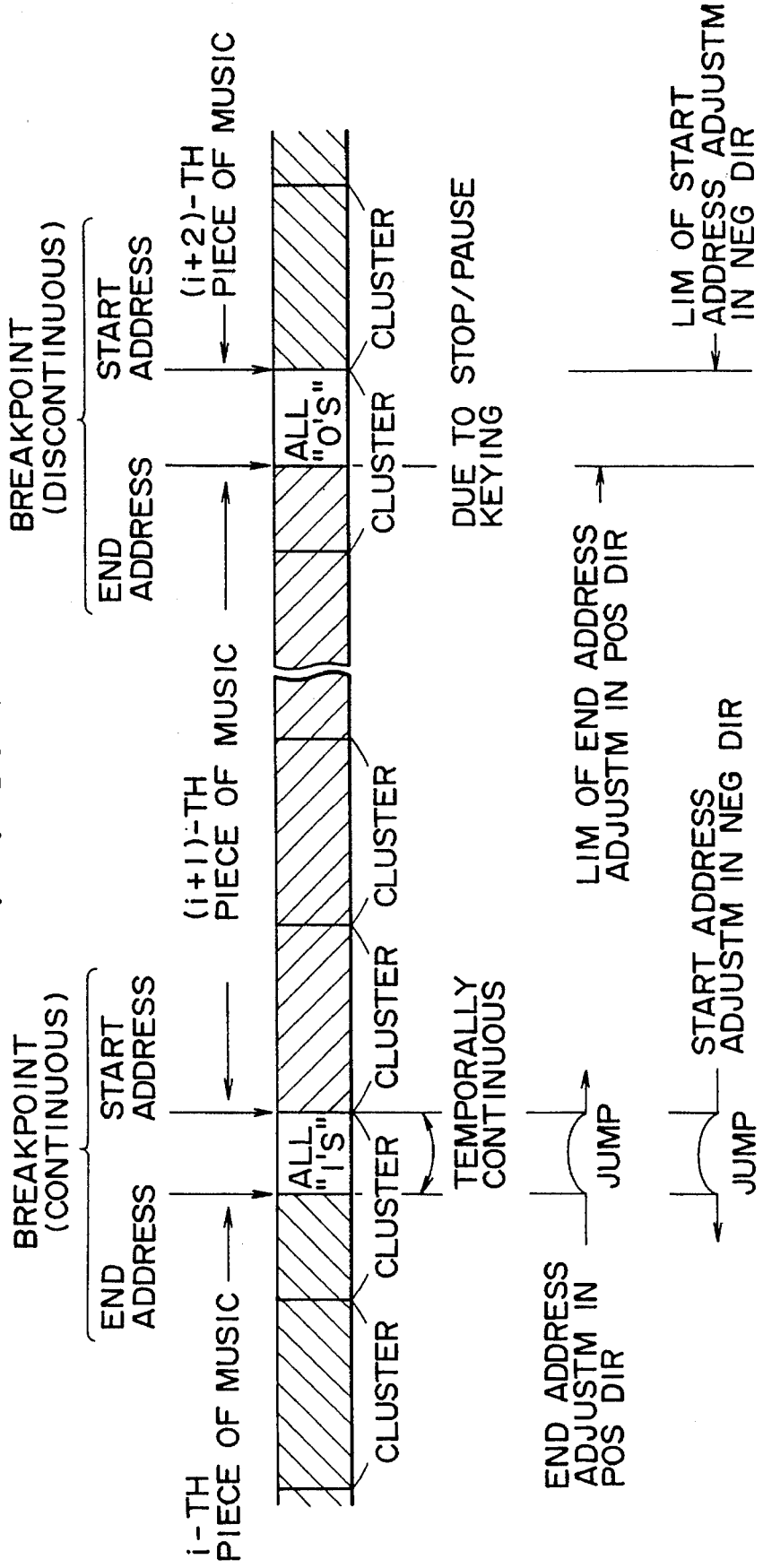

METHOD FOR RECORDING OF DISK AND APPARATUS FOR ADJUSTING POSITION OF BREAKPOINT OF AUDIO DATA

This is a divisional of application Ser. No. 08/154,297, filed Nov. 18, 1993, pending.

BACKGROUND OF THE INVENTION

1. Field of the Invention

The present invention relates to a method of recording audio data on a disk and an apparatus for adjusting the position of a breakpoint of audio data, which is used for cuing and the like of the recorded data.

2. Description of the Related Art

There has so far been known a method used for continuously recording an audio signal on a recording medium, such as a tape, in which a fall of the level from a predetermined value of the audio signal (for example, a silent interval between pieces of music) is detected and, thereby, a breakpoint of the audio signal such as a breakpoint between pieces of music is detected and a marker is recorded on the recording medium at the breakpoint, and then the marker is detected at the time of playback of the tape for setting up for example the start point or end point of a piece of music for use in the playback.

In the above described case, since the position of the marker automatically recorded as described above is set up after a fall of the level has been detected, the marker tends to be set up somewhat delayed from the actual breakpoint. Hence, sometimes such a thing occurs that the head of a piece of music is not played back. Further, how long a time is preferred to take from the cuing position to the start of the playback of the audio signal is dependent on the taste of the user. Therefore, there is considered a recording and playback apparatus having a function to adjust the position of breakpoint so that the marker position can be manually adjusted after the recording was made.

The present applicant previously proposed an apparatus for recording an audio signal, after compressing data of the audio signal, on a disk smaller in diameter than a compact disk and then playing back the audio signal (U.S. Pat. No. 5,224,087, U.S. Pat. No. 5,243,588, and others). In the proposed system, absolute address data is previously recorded on the disk and the disk is provided thereon with an area called a user TOC (Table Of Contents). Hence, it is considered to record in the user TOC the absolute address of the position of a breakpoint of the audio data, such as a breakpoint between two pieces of music, as the positional information of the breakpoint. In such case, the adjustment of the breakpoint position can be achieved by changing the address information of the position of a breakpoint recorded in the user TOC.

The above described function to adjust the position of a breakpoint of the audio data is effective when the audio data is recorded temporally continuously at the position of breakpoint. When for example a stop key or a pause key is pressed, the temporal continuity between the data preceding the breakpoint and that subsequent to the breakpoint is broken off. Then, such changing of the breakpoint position as to shift the position of the breakpoint to the recorded position of the data preceding the breakpoint or subsequent to the breakpoint becomes meaningless and, in some case, it causes a difficulty.

SUMMARY OF THE INVENTION

An object of the present invention is to provide an apparatus for adjusting the position of breakpoint of audio data which, when sequentially recording audio data on a disk in units of predetermined data amounts as described above, does not cause such difficulties as described above.

In order to realize such an apparatus for adjusting the position of breakpoint of audio data, it is essential to make it possible to detect a temporal continuity and discontinuity of the audio data.

Another object of the present invention is to provide a disk recording method which makes it easy to detect a temporal continuity and discontinuity of audio data while the audio data is being sequentially recorded on a disk in units of predetermined data amounts as described above.

In order to overcome the above described difficulties, a method of recording according to the invention, in a method of performing data compression of audio data and sequentially recording the data on a disk in units of the data, each unit being formed of a predetermined amount of the data, comprises the steps of:

detecting a breakpoint of the audio data;

continuously recording the audio data input temporally continuously, by joining, even at the breakpoint, the data preceding and subsequent to the breakpoint thereby forming the unit data; and recording a piece of information indicating the position of the breakpoint on the disk.

Further, in a method of recording according to the invention, when an operation to suspend or stop the recording operation has been made, the data amount corresponding to the unit data is recorded as the last record data even when the last recorded data is short of the unit data and the following data is started to be recorded from new unit data.

Further, when the last recorded data is short of a unit data amount, the remaining portion of the unit data amount is filled with data of a special pattern.

Since a special pattern is recorded in the position of a breakpoint of the data in the above described construction, it is made possible to recognize continuity and discontinuity of the data preceding and subsequent to the breakpoint.

BRIEF DESCRIPTION OF THE DRAWINGS

FIG. 3 is a diagram explanatory of contents of data in the sector 0 of UTOC;

FIG. 4 is a diagram explanatory of contents of data in the sector 1 of UTOC;

FIG. 5 is a diagram explanatory of contents of data in the sector 2 of UTOC;

FIG. 7 is a diagram explanatory of another example of recording method according to the invention.

DESCRIPTION OF THE PREFERRED EMBODIMENTS

An embodiment of the present invention will be described below with reference to the accompanying drawings taking, as an example, a case where the invention is applied to a recording and playback apparatus of the above described disk system. Before describing the invention, the recording and playback apparatus to which the invention is applied will first be described.

Construction of Recording and Playback Apparatus]

Figure 1:
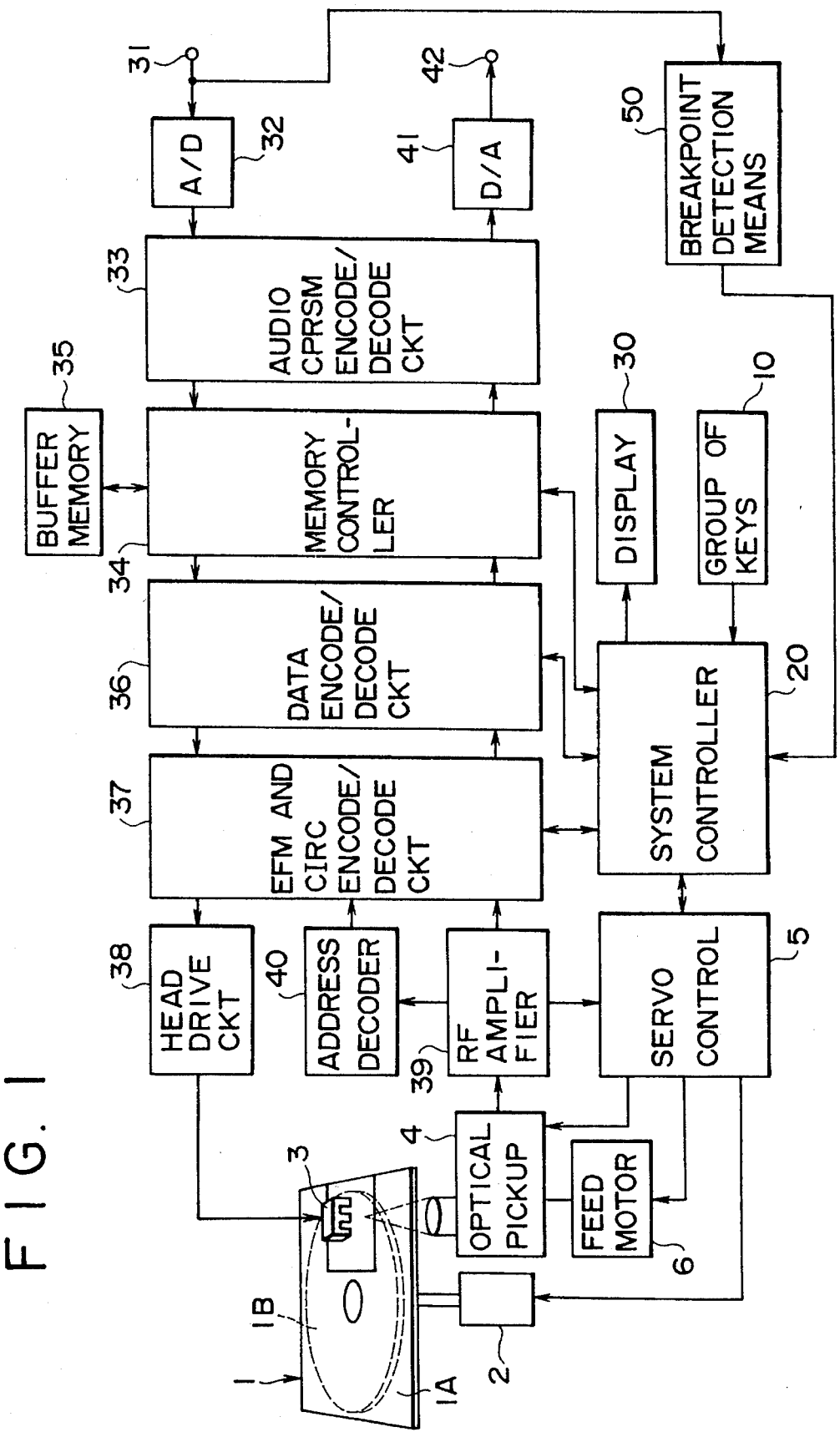
FIG. 1 is a block diagram of an example of a disk recording and playback apparatus to which a recording method of the invention is applicable.

FIG. 1 shows a structure of a disk recording and playback apparatus to which the invention is applied. Referring to FIG. 1, a disk-formed recording medium 1 is constructed by having a disk 1B with a diameter of 64 mm contained in a cartridge 1A. Of the disk-formed recording medium 1, there are three types: a playback-only optical disk, a recordable magnetooptic disk, and a hybrid disk with playback-only area and recordable area mixed therein.

In the disk 1B, there is previously formed a pregroove for optical spot control (tracking control). Especially in this example, there is previously recorded absolute address data by wobbling the pregroove.

The disk 1B is rotated by a spindle motor 2. The rotation of the spindle motor 2 is controlled by a servo control circuit 5 so that the disk 1B rotates at a constant linear speed. The cartridge 1A is provided with a shutter and, when the cartridge 1A mounted on a disk mounting tray is loaded in the apparatus, the shutter is opened. In the case of a recordable optical disk, a magnetic head 3 for recording is disposed above the shutter opening of the disk 1B confronting the same and an optical pickup 4 is disposed below the shutter opening of the disk 1B confronting the same.

The optical pickup 4 is controlled for its movement in a radial direction of the disk 1B by a feed motor 6. Further, the optical pickup 4 is controlled for its focusing and tracking by the servo control circuit 5.

A system controller 20 is constituted of a microcomputer and executes control of overall operations. The system controller 20 is supplied with input signals from a group of keys 10. The group of keys 10 comprises power supply key, eject key, playback key, pause key, stop key, record key, fast forward playback key, rewind playback key, and the like.

On a display 30, such time information is displayed as the total playing time of the disk loaded, the elapsed time from the start of the music being played, the remainder of the playing time of a piece of music being played, the remainder of the total playing time, the track number of the music being played, and the like. In the case of a disk having the disk name and track names (names of pieces of music), the disk name and track name are displayed. Further, when date and time of recording of the music or disk are recorded, such date and time of recording are displayed.

The structure of the record and playback signal system of the embodiment shown in FIG. 1 is designed to be as simple as possible by being arranged in an IC. In switching the system between the recording mode and the playback mode, it is adapted such that the mode of each part is switched by a mode switching signal from the system controller.

During recording, an audio signal is supplied to the input terminal 31. The audio signal is digitized in an A/D converter 32 at a sampling frequency of 44.1 kHz and a quantizing bit number of 16 bits.

The digital audio signal is supplied to an audio compression encode/decode circuit 33. In the audio compression encode/decode circuit 33, an audio signal is compressed for data to approximately ⅕. As a compression technique of the audio signal, the modified DCT (Modified Discrete Cosine Transform) for example is used.

The audio signal compressed in the audio compression encode/decode circuit 33 is temporarily stored in a buffer memory 35 through a memory controller 34, which controls the buffer memory 35. The buffer memory 35 is constituted for example of a DRAM with a 1-Mbit data capacity.

In the course of normal recording, the memory controller 34 sequentially reads the data compressed to approximately ⅕ out of the buffer memory 35 and transfers the read data to a data encode/decode circuit 36.

When it is detected that a track jump of the pickup 3 due to vibration or the like has occurred during the recording, the memory controller 34 stops the transfer of data to the data encode/decode circuit 36 and accumulates the compressed data from the audio compression encode/decode circuit 33 into the buffer memory 35. Then, control is executed such that, after the record position is corrected and the position before the track jump occurred is restored, the data transfer from the buffer memory 35 to the data encode/decode circuit 36 is resumed.

The detection of occurrence of any track jump can be achieved for example by providing a shock detector in the apparatus and causing the shock detector to detect whether or not the magnitude of any shock is such as to cause a track jump. Since there is previously recorded an absolute address data in the pregroove of the disk 1B of the present example as described above, the absolute address can be read during the recording and a track jump can be detected from the continuity of the decoded output of the read absolute address data. It is possible to detect a track jump also by having the function of logical OR performed on the data from the shock detector and the continuity of the absolute address data. When a track jump occurs, control is executed such that the power of the laser beam for magnetooptic recording is lowered or the power is reduced to zero.

The correction of the recording position, when a track jump has occurred, can be made using the above described absolute address data. In this case, as understood from the above, a capacity capable of storing compressed data corresponding to the period of time from occurrence of a track jump to the completion of correction of the recording position is at least required as the data capacity of the buffer memory 35. The buffer memory 35 in the present example has a 1-Mbit capacity as described above and this capacity has been selected as such that will meet, with a margin, the above described requirement.

In the present case, the memory controller 34 executes memory control during the recording such that the data stored in the buffer memory 35 in the normal operation may become as small as possible. More specifically, control is executed, when the data amount stored in the buffer memory 35 exceeds a predetermined amount {for example, 32 sectors [1 sector corresponds to 1 block of a CD-ROM (approximately 2 Kbytes)]}, such that the predetermined amount of data is read out of the buffer memory 35 and, thereby, a write space of more than a predetermined data amount is secured in the buffer memory 35 at all times.

The data encode/decode circuit 36 encodes compressed data transferred from the buffer memory 35 to data of a CD-ROM sector structure. Data of 36 sectors including audio data of 32 sectors and linking data for connecting data will hereinafter be called a cluster. As described later, recording and playback is performed in units of such clusters.

Output data of the data encode/decode circuit 36 is supplied to the EFM and CIRC encode/decode circuit 37. In this circuit 37, error detection and correction encoding is applied to the data and also modulation processing suitable for recording, EFM (Eight to Fourteen Modulation) in this example, is applied to the data. As the error detecting and correcting code, CIRC (Cross-Interleave Reed-Solomon Code) with a modified interleave system for CD (compact disk) is used. The record data is intermittent data of which 1 cluster is formed of 36 sectors consisting of 32 sectors of audio data and 4 sectors for connecting clusters (hereinafter called linking sectors) placed before and after the 32 sectors of audio data.

Figure 2:
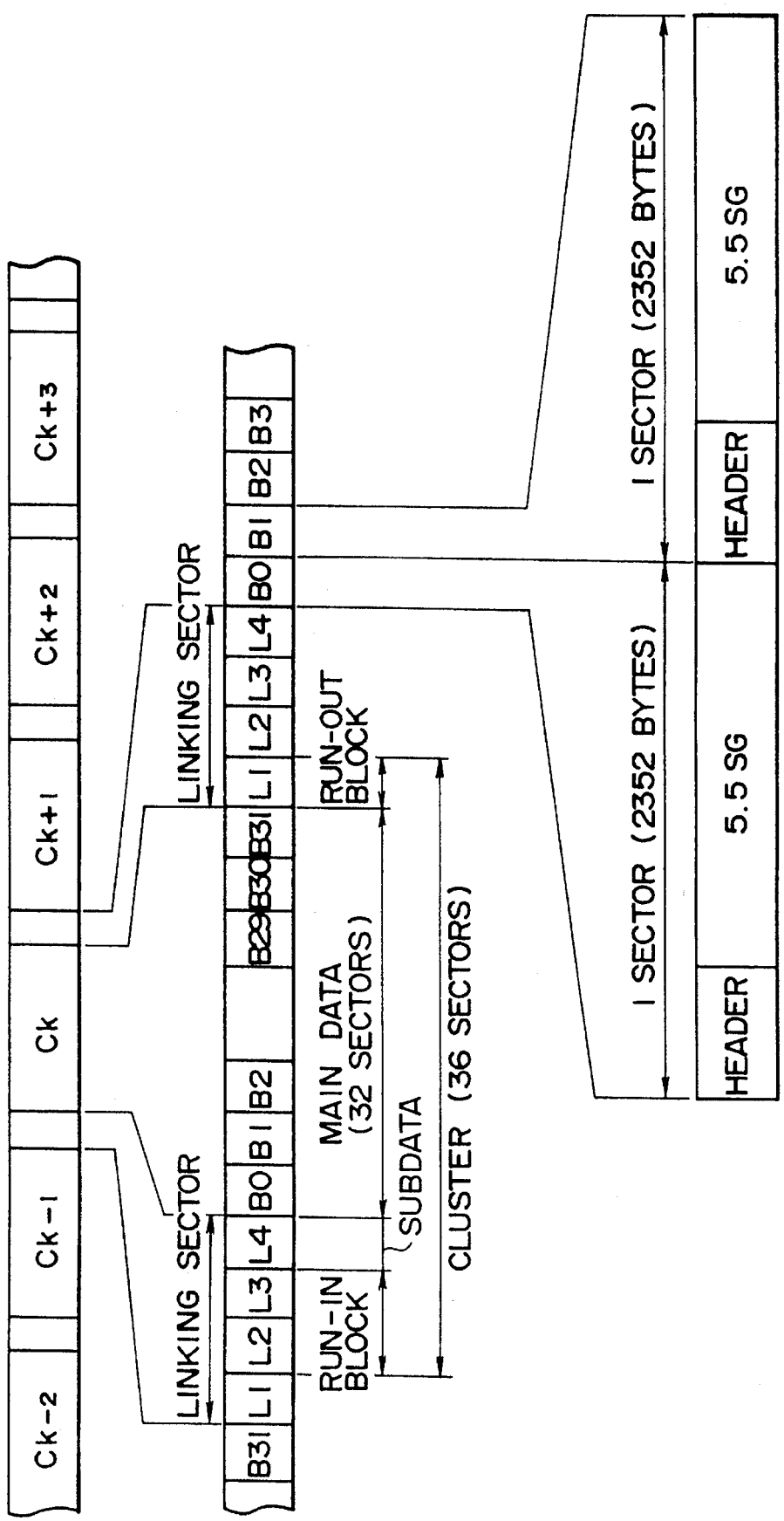
FIG. 2 is a diagram explanatory of record data in the example of FIG. 1.

FIG. 2 is a diagram for explaining record data undergoing the encoding processing, in which Ck, Ck+1, Ck+2, . . . denote encoded data (main data) of the k-th, (k+1)-th, (k+2)-th, . . . clusters, respectively. More specifically, the record data is of such an arrangement having 4 linking sectors L1 to L4 inserted between adjoining main data, each of which is formed of 32 sectors B0 to B31. When one cluster, for example the k-th cluster, is recorded in this example, a cluster of 36 sectors consisting of 32 sectors B0 to B31 of the main data Ck, 3 linking sectors placed before the data Ck, and 1 linking sector placed after the data Ck is generated and the data is recorded as one unit.

The linking sectors placed before the data Ck are formed of two sectors L2 and L3 for run-in block and one sector L4 for subdata. The sector L4 for subdata is an area which can be used for displaying a still picture or the like. The sector L1 at the rear of the main data Ck of the cluster is for run-out block. Thus, the record data are handled intermittently in units of 36 sectors. The 4 sectors of the linking sectors are also used as areas for matching the record data in timing with the rise of the magnetic field of the magnetic head 3 at the start of the intermittent recording or the control of the laser power.

As shown in FIG. 2, 1 sector is formed of 2352 bytes and the front of it is set to be a 16-byte header. In each sector, there are contained 5.5 units of data each thereof being called a sound group (SG) and formed of 424 bytes, and hence there are formed 11 sound groups in 2 sectors. While compressed audio data can be decoded from each sound group as one unit, a two-channel stereo audio signal can be properly reproduced from 11 sound groups contained in two sectors.

The record data generated in the arrangement as described above is supplied to the recording magnetic head 3 through a head drive circuit 38. Thereby, a magnetic field modulated by the record data is applied to the disk 1B (magnetooptic disk). Further, a laser beam from the optical pickup 4 is thrown on the disk 1B. During this recording, the recording track is irradiated by a laser beam with a constant power, which is larger than the power used in the playback. Under application of irradiation of this laser beam and the modulated magnetic field from the magnetic head 3, data is recorded on the disk 1B by thermal magnetic recording. Meanwhile, the magnetic head 3 and the optical pickup 4 are allowed to move in synchronism with each other in a radial direction of the disk 1B.

During the recording, the output of the optical pickup 4 is supplied to an address decoder 40 through an RF amplifier 39 and, thereby, the absolute address data recorded in the pregroove formed along the track of the disk 1B is extracted and decoded. The detected absolute address data is supplied to the EFM and CIRC encode/decode circuit 37 so as to be inserted into the record data and recorded on the disk. The absolute address data is further supplied to the system controller 20 to be used for recognition of the recording position and position control.

A signal from the RF amplifier 39 is supplied to the servo control circuit 5 and a control signal for constant linear speed servo controlling of the spindle motor 2 is generated from the signal from the pregroove of the disk 1B, and, thereby, the speed of the spindle motor 2 is controlled.

Operations in the playback will now be described. In the playback, the spindle motor 2 is controlled by the servo control circuit 5 according to the signal from the pregroove so that the disk 1B rotates at the same constant linear speed as that in the recording.

During the playback, the optical pickup 4 detects a reflected beam of the laser beam thrown on a target track to thereby detect a focus error by using for example an astigmatic method. It also detects a tracking error by using for example a push-pull method. Further, it detects a difference in angle of deflection (angle of Kerr rotation) of the reflected beam from a target track to output a played back RF signal.

The output of the optical pickup 4 is supplied to the RF amplifier 39. The RF amplifier 39 extracts the focus error signal and tracking error signal from the output of the optical pickup 4 and supplies them to the servo control circuit 5. On the other hand, it binarizes the played back RF signal and supplies the binarized signal to the EFM and CIRC encode/decode circuit 37.

The servo control circuit 5 executes focus control of the optical system of the optical pickup 4 by bringing the above described focus error signal to zero and also executes tracking control of the optical pickup 4 by bringing the tracking error signal to zero.

The RF amplifier 39 also supplies its output to the address decoder 40 and, therein, the absolute address data from the pregroove is extracted and decoded. The absolute address data from the decoder 40 is supplied to the system controller 20 through the circuit 37 for use in playback position control by the servo control circuit 5 of the optical pickup 4 in the radial direction of the disk. Further, the system controller 20 can use address information of each sector extracted from the played back data for controlling the position being scanned by the optical pickup 4 along the record track.

During the playback, the compressed data read out of the disk 1B is written into the buffer memory 35 and then read out of it and expanded to approximately five times. However, as will be explained subsequently, because of the difference in transmission rates of the data, reading of the data from the disk 1B by the optical pickup 4 is performed intermittently such that the buffer memory 35 does not overflow with data or the data stored in the buffer memory 35 does not decrease below a predetermined amount.

In the EFM and CIRC encode/decode circuit 37, the signal supplied thereto through the RF amplifier 39 is EFM-demodulated and subjected to error correcting processing. The output of the EFM and CIRC encode/decode circuit 37 is supplied to the data encode/decode circuit 36 and, therein, the data is released from the sector structure for CD-ROM and decoded to the original data in the state of compressed data.

The output of the data encode/decode circuit 36 is temporarily stored in the buffer memory 35 through the memory controller 34. The memory controller 34, in the normal playback, writes the data in the compressed state from the circuit 36 into the buffer memory 35 and reads the data therefrom at a constant transfer speed which is approximately ⅕ of the write speed and transfers the read data to the audio compression encode/decode circuit 33. At this time, the memory controller 34 controls write/read of data into and out of the buffer memory 35 such that writing is stopped before the buffer memory 35 overflows and the data amount stored in the buffer memory 35 does not decrease below a predetermined amount.

When it is detected that a track jump has occurred during the playback, the writing of data from the data encode/ decode circuit 36 into the buffer memory 35 is stopped and only the transfer of data to the circuit 33 is performed. Then, control is executed such that the writing of data from the circuit 36 into the buffer memory 35 is resumed after the playback position has been corrected.

As described above, the memory controller 34, in the normal operation, executes memory control such that a predetermined amount of data above a required minimum amount is stored in the buffer memory 35 as much as practicable. For example, if the data amount in the buffer memory 35 decreases below the predetermined amount, memory control is executed such that the intermittent pickup of data from the disk 1B by the optical pickup 4 is performed and the writing of data from the data encode/decode circuit 36 is performed, so that the state in which data above a predetermined data amount is stored is secured at all times.

The time required for writing data into the buffer memory 35 to the full while data is being read out of it is approximately 0.9 second and the thus stored data, by being expanded, corresponds to audio data for about 3 seconds. Namely, even if reading a signal from the disk 1B becomes impossible, outputting the played back signal can be continued for about 3 seconds provided that data is stored in the buffer memory 35 to the full. By causing the optical pickup to access the original position in the meantime and resume the reading of the signal, the occurrence of a jump of sound can be prevented.

Data released from the compressed state in the audio compression encode/decode circuit 33 is supplied to a D/A converter 41 to be restored to an analog signal. This analog signal is output from an output terminal 42.

On the innermost circumference of the disk 1B, there is provided a TOC (Table Of Contents). In the TOC, such information as the start address and end address of each piece of music in the disk, the track name as the name of a piece of music, and the disk name as the name of the disk is written.

In order to manage recorded audio signals, there is provided a UTOC (user TOC) in a recordable disk. In the UTOC, there are sector 0, sector 1, and sector 2.

FIG. 3 is a diagram showing a structure of the sector 0 of the UTOC. In the sector 0, there are written record conditions of the disk 1B. In P-TNOn (n =1, 2, . . . , 255), there is recorded a pointer on the sector 0 in which the address at which the n-th piece of music starts is recorded. More specifically, if "m" (m =1, 2, . . . ) is recorded in the P-TNOn, the start address and end address of the n-th piece of music are written starting from the (76+m×2)×4 byte of the sector 0.

FIG. 4 is a diagram showing a structure of the sector 1 of the UTOC. In the sector 1, there is recorded information of the disk name and track names. The information is in the ASCII code. In P-TNAn (n=1, 2, . . . , 255), there is written the start address on the sector 1 in which the track name of the n-th piece of music is recorded For example, when the P-TNA1 is "m" the track name of the first piece of music is written starting from the (76+m×2)×4 byte of the sector 1. The same rule applies to the P-TNA2 downward. The disk name is written starting from the 76×4 byte of the sector 1.

FIG. 5 is a diagram showing a structure of the sector 2 of the UTOC. This sector 2 is a sector for recording the date and time of recording. In a recording apparatus having this function, the date and time are automatically recorded during the recording. In P-TRDn, there is written the start address on the sector 2 in which the recorded date and time of the n-th piece of music is recorded. For example, when the P-TRD1 is "m", the recorded date and time of the first piece of music is written starting from the (76+m×2) ×4 byte of the sector 2. The same rule applies to the P-TRD2 downward. The recorded date and time of the disk is written starting from the 76×4 byte of the sector.

In the information of each track of the sector 0 and sector 1 of the UTOC, there is included information called Link-P. The information Link-P in the sector 0 indicates, when data of a piece of music is recorded in discontinuous positions on the disk in units of clusters, the record position on the disk in which a unit of data of the music is continued, and that in the sector 1 indicates the record position on the disk in which a piece of music of a particular name is continued.

The TOC information and the UTOC information are read out from the disk when a disk is loaded and are stored into a portion of the buffer memory 35. The operation to change the UTOC is performed when recording or edition is made or inputting of a disk name or a name of a piece of music is made. When such an operation is made, first, the UTOC information stored in the portion of the buffer memory 35 is updated. When the eject key or a secondary power supply key (a main power supply switch is provided separately) is operated, a new set of UTOC information is recorded in the UTOC area of the disk 1B.

[An Example of a Recording Method]

Figure 6A:
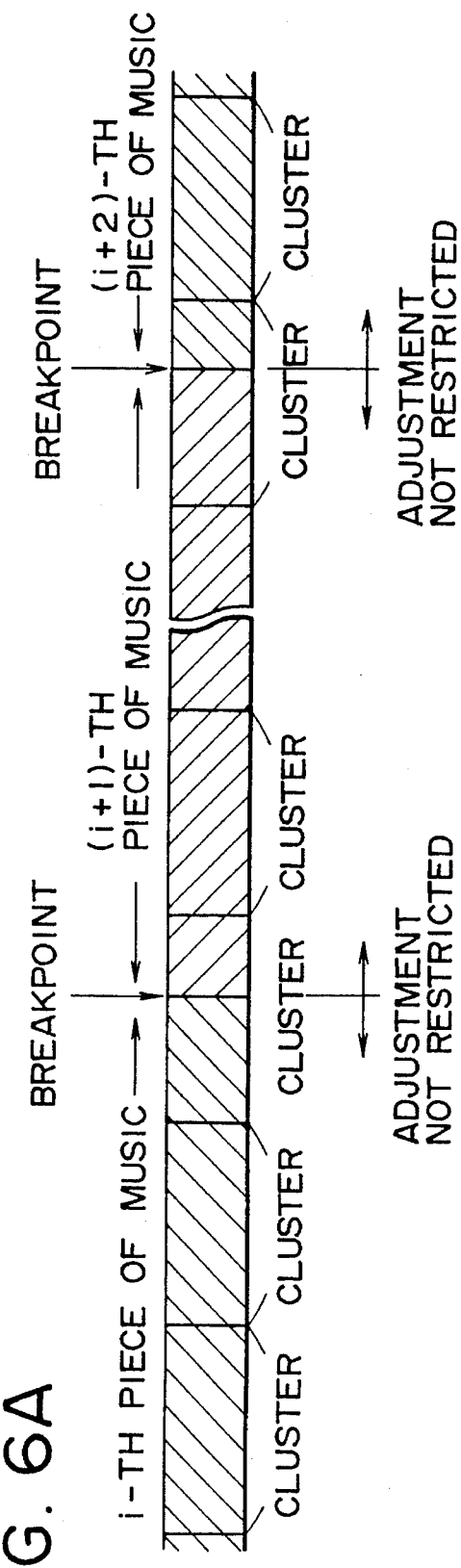
FIGS. 6A and 6B are diagrams explanatory of an example of recording method according to the invention.
Figure 6B:
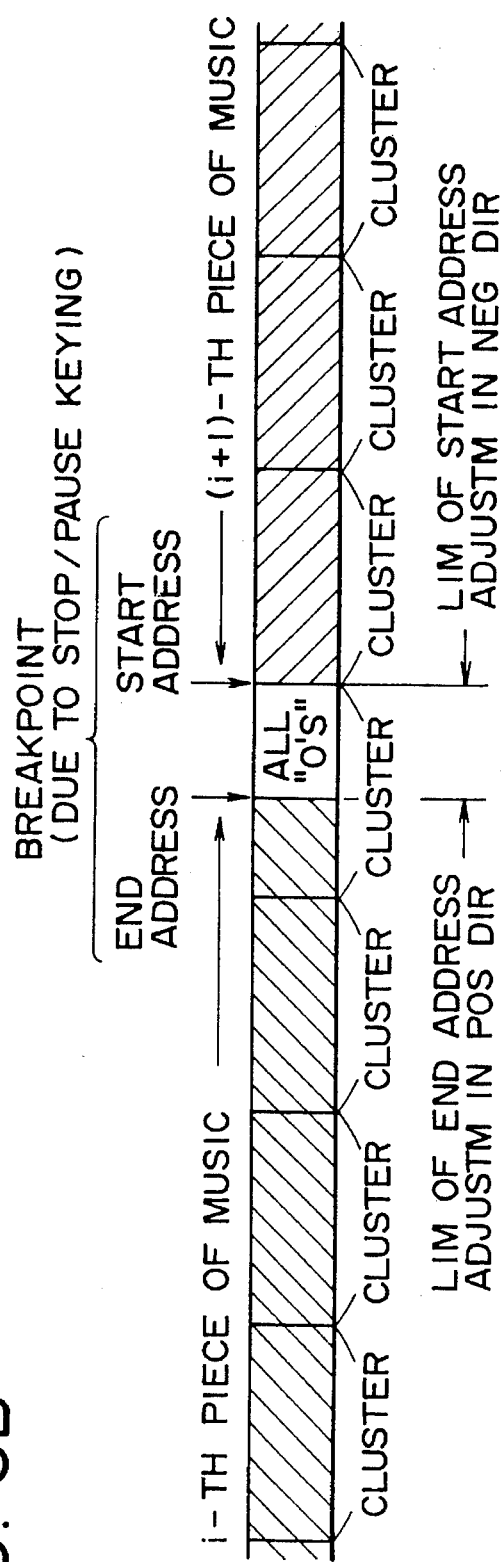

FIGS. 6A and 6B diagrams explanatory of the recording method of the present example. Now consider two manners for recording a disk: one (FIG. 6A) in which an audio signal is continuously recorded for plural pieces of music without causing the recording apparatus to stop or pause in the meantime, and the other (FIG. 6B) in which an audio signal is recorded by causing the apparatus to repeat the cycle of recording→stopping or pausing (temporary stopping)→recording→stopping or pausing.

In the description given below, the case in which plural pieces of music are recorded as an audio signal will be considered.

First, the example of recording manner shown in FIG. 6A will be described.

While audio data was intermittently recorded in units of clusters in the above described recording and playback apparatus, the recording in the present example is performed, as long as audio data is recorded without the stop or pause key being operated, such that a cluster, even when there appears therein a breakpoint between adjoining pieces of music, is recorded unchanged and continuously as shown in FIG. 6A. Namely, the end portion of the i-th piece of music and the start portion of the (i+1)-th piece of music are recorded in the same cluster. However, the address information of the breakpoint between the i-th piece of music and the (i+ 1)-th piece of music is temporarily stored into memory and later written into the UTOC.

More specifically, as shown in FIG. 1, the audio signal from the input terminal 31 is supplied to a breakpoint detection circuit 50, in which the level of the input signal is compared with a threshold value and a low level portion detectable as being silent is detected to be a breakpoint. This output of the detected breakpoint is supplied to the system controller 20 and the address information (for example, absolute address) corresponding to the point of time when the detection output is obtained is stored, for example, into its internal memory.

For example, when the i-th piece of music is ended at a point of time t1 and the breakpoint is detected by the breakpoint detection circuit 50, the end portion of the data of the music is written in the cluster after a delay of Δt, which is the time delay in the audio compression encode/decode circuit 33, encode/decode circuits 36 and 37, memory controller 34, and the buffer memory 35.

In this case, the absolute address data on the disk corresponding to the time (t+Δt) is stored into memory. Input audio data after the detection of the breakpoint is continuously recorded by joining the data of the (i+1)-th piece of music to the end of the i-th piece of music to form one cluster as shown in FIG. 6A. The address data of the position of the breakpoint is recorded in the UTOC of the disk as described above when the disk is ejected.

Now, the example in which the recording is performed in the manner shown in FIG. 6B will be described. In this example, if recording is made completely the same as in the case of the example shown in FIG. 6A while no stopping or pausing operation is made, an audio signal is recorded temporally continuously. However, if a stop key or a pause key is operated during this recording, the recording of the data is stopped or suspended with the cluster completed as one unit as shown in FIG. 6B. When the apparatus is brought into the recording mode again, recording of the new data is started from a new cluster, not mixed with the old data in the old cluster as in the case of FIG. 6A.

In this case, when the last audio data immediately before the stopping or suspension of the recording is short of one cluster (this is the case which generally occurs), data of a specific pattern, for example all "0's" in this case, is additionally recorded as the remaining data to form one complete cluster.

While various methods can be considered as the method to insert such all "0's" it is arranged in this example such that one cluster on the buffer memory 35 is previously filled with all "0's" and input audio data are written over the "0's" in the memory. Through such arrangement, all "0's" are automatically added to the end of that data being short of one cluster at the end of a piece of music, and recorded.

At this time, as shown in FIG. 6B, the position of the end data of the i-th piece of music is stored in memory as the end address of this piece and the record position of the start data of the (i+1)-th piece of music is stored in memory as the start address of this piece, and the addresses are recorded in the UTOC later.

Accordingly, in the position of the breakpoint where data become temporally discontinuous, there are recorded all "0's" between the end of the i-th piece of music (end address) and the start of the (i+1)-th piece of music (start address).

[Adjustment of Position of Breakpoint in the Example of Recording Method of FIGS. 6A and 6B]

This adjustment is such that allows the user to finely adjust, according to his taste, the position of cuing of a piece of music or the position of the end of a piece of music in the playback of a disk (either of which corresponds to the temporal position).

In the recorded state shown in FIG. 6A, plural pieces of music are recorded temporally continuously. Therefore, the start address or the end address of the piece of music recorded in the UTOC as an address in the middle of a cluster can be temporally shifted and adjusted in either of the forward and backward directions.

However, in the position where the stop key or pause key was operated and, thereby, the record of the audio signal is made temporally discontinuous as shown in FIG. 6B, it is meaningless to shift the start address of a piece of music beyond its start position in the temporally forward (negative) direction because it shifts the start address to the end portion of the previous piece of music, with which it has no temporal continuity. Likewise, it is meaningless to shift the end address of a piece of music beyond its end position in the temporally backward (positive) direction because it shifts the end address to the start portion of the following piece of music, with which it has no temporal continuity.

Hence, in the adjustment of the audio data when it is recorded as shown in FIG. 6B, an adjusting operation of the position of a breakpoint where preceding and subsequent data are temporally discontinuous is limited as described below.

Namely, a start address is allowed to be freely shifted in the temporally backward direction (positive direction) but, when it is shifted in the temporally forward direction (negative direction), if a predetermined number of "0" data are obtained in succession as played back data, any more forward shift of the start address is forbidden.

Also, an end address is allowed to be freely shifted in the temporally forward direction but, when it is shifted in the temporally backward direction, if a predetermined number of "0" data are obtained in succession as played back data, any more backward shift of the end address is forbidden.

Since the portion in which "0's" continue as reproduced data indicates the position of a temporally discontinuous breakpoint as described above, a meaningless adjusting operation can be prevented from being made by the user.

In the above described example, the specific pattern to be inserted in the position of the temporally discontinuous breakpoint is not limited to the all "0's", but all "1's", data of such pattern as will not appear as audio data or control data, and the like can be used.

[Another Example of a Recording Method and Adjustment of Address of Breakpoint]

FIG. 7 is a diagram explanatory of a recording method of another embodiment. In this example, when it is detected by the detection means 50 that one piece of music has changed to another while an audio signal is being recorded temporally continuously, the latter piece is not joined to the former piece in the middle of the cluster even when the former is short of one cluster, but the latter piece is arranged to be recorded from a new cluster.

Accordingly, in the case of a disk recorded according to this recording method, both the breakpoint between pieces of music appearing while an audio signal is being recorded temporally continuously and the breakpoint between pieces appearing when an audio signal is recorded temporally discontinuously with a stop key or a pause key operated assume the same state of recorded data. Hence, it is difficult to distinguish between both the methods.

Hence, it becomes necessary to take a measure to distinguish between the two methods.

In a first example to distinguish between the temporally continuous data and the temporally discontinuous data, when the last audio data immediately before the stopping or pausing of recording is short of one cluster, all "0's" for example, is inserted as the remaining data to complete one cluster. On the other hand, while temporally continuous recording is being made, when a piece of music is change to another and the last audio data of the former piece of music is short of one cluster, specific pattern data other than all "0's" which was the specific pattern data in the above case, such as, for example all "1's", is inserted as the remaining data to form one complete cluster.

The above described measure can be carried out by having all "1's" written as one cluster in the buffer memory and writing, when the stop key or pause key is operated, the data short of one cluster appearing immediately before the operation of the stop key or pause key over the cluster.

Also in this recording method, in the adjustment of the address of the breakpoint, the adjusting operations are limited at the breakpoint between two temporally discontinuous data. More specifically, when the start address or end address of a piece of music is shifted, if a plurality of "0" data in succession are obtained as played back data, the start address or end address is forbidden from being shifted in that direction.

On the other hand, in the case of the breakpoint between two temporally continuous data, when the start address of the latter is shifted in the direction of the former piece of music, i.e., in the temporally negative direction, if a predetermined number of "1" data in succession are obtained as played back data, the adjustment in the negative direction is achieved by jumping the all "1's" data to arrive at the end address of the former piece. This adjustment is justifiable because the former piece and the latter piece are temporally continuous. The same holds in the case where adjustment is made by shifting an end address in the temporally positive direction.

The breakpoint can be detected to be temporally continuous not by detecting all "1's" data in succession but by referring to the recorded time information in the UTOC, and therefore, when the breakpoint is that between temporally continuous data, the adjustment of either of the end address and start address can be done without any restriction by jumping over the interval between both the addresses.

A second example to distinguish between a breakpoint between temporally continuous data and a breakpoint between temporally discontinuous data in the case where an audio data is recorded according to the recording method shown in FIG. 7 will be described below.

In the second example, when the amount of the last audio data immediately before the breakpoint is short of one cluster, specific pattern data, for example all "0's" is inserted as the remaining data necessary to form one complete cluster no matter whether the breakpoint is that between temporally continuous data or that between temporally discontinuous data. Or, instead of inserting specific pattern data into the remaining portion of the cluster, the data to be inserted may be left blank. Since an overwrite recording system is adopted in the present disk system, old data remains where the inserted data is blank. However, such unnecessary data is neglected in the normal playback in accordance with the above described end address and start address of pieces of music recorded in the UTOC.

Further, in order to distinguish between a breakpoint between temporally continuous data and a breakpoint between temporally discontinuous data in this second example, it is adapted such that, when the stop key or pause key has been operated, a piece of distinguishing information such as a flag indicating that the key was operated is recorded in the UTOC.

When adjusting the start address or end address of a piece of music, the flag information in the UTOC is referred to and, at the portion of a breakpoint produced by an operation of the stop key or pause key in the recording, the shift of the start address in the direction of the temporally preceding piece of music is forbidden and the shift of the end address in the direction of the temporally subsequent piece of music is forbidden, and thus meaningless adjustments are prevented from being made by the user the same as in the above described case.

In a third example to distinguish between a breakpoint between temporally continuous data and a breakpoint between temporally discontinuous data in the case where an audio data is recorded according to the recording method shown in FIG. 7, it is adapted such that whether the breakpoint is that between temporally continuous data or it is that between temporally discontinuous data is discriminated by referring to information about the recorded point of time in the UTOC.

More specifically, since the recorded date and time of each piece of music is recorded in the sector 2 of the UTOC, whether the pieces of music preceding and subsequent the breakpoint are temporally continuous or not can be determined by reference to the information about the recorded date and time and the length of the pieces of music. Also in this case, the adjusting direction in the adjustment is restricted the same as in the above described cases at a breakpoint between temporally discontinuous data.

Although the cases where the breakpoint between audio data is the breakpoint between pieces of music were described above, the breakpoint is not limited to that between pieces of music. For example, the present invention can be applied to such a case where a breakpoint, as a marker, is forcedly inserted into a recorded audio signal in the course of recording.

According to the present invention, as described above, when a position of the breakpoint of audio data is adjusted after the recording has been made, an adjustment in a direction making the adjustment meaningless can be prevented from being made by the user.

According to the recording method of the present invention, it is possible to realize the function preventing the above described meaningless adjustment from being made when the position of the breakpoint of audio data is adjusted.

What is claimed is:

1. An apparatus for adjusting the position of a breakpoint of audio data recorded on a disk in units of the data, each unit being formed of a predetermined amount of the data, said disk having address information corresponding to the recorded position on said disk of each breakpoint of said audio data recorded thereon comprising;

adjustment means for adjusting the position of said breakpoint of data by changing said address data;

detection means for detecting whether the recording of the audio data preceding and subsequent to said breakpoint was continuous or interrupted; and control means for controlling the adjustment means, when the recording of the audio data preceding and subsequent to said breakpoint is detected to be interrupted by said detection means, to prevent the changing of the address information by said adjustment means in a manner which would make the audio data recorded before and after said breakpoint temporally continuous.

2. An apparatus for adjusting the position of a breakpoint of audio data according to claim 1, wherein said detection means detects whether or not the recording of the audio data preceding and subsequent to said breakpoint is interrupted according to temporal information of each set of the data recorded on said disk separated by said breakpoints.

3. An apparatus for adjusting the position of a breakpoint of audio data according to claim 1, wherein said detection means detects whether or not the recording of the audio data preceding and subsequent to said breakpoint is interrupted according to information about record data recorded in an area other than the area recording said audio data therein of said disk.

4. An optical disc recording apparatus according to claim 1, wherein the unit of data is formed of clusters of 32 data sectors and 4 linking sectors, each sector having 2352 bytes of data.

5. An optical disc recording apparatus for recording on a disc having an address information which is used to detect a start point or an end point of data and a recording area in which is recorded the data and a management data area in which is recorded a management data, the recording apparatus comprising:

recording means for recording on the disc the data in units which are each composed of a predetermined amount of the data;

detecting means for detecting a changing position between the data and producing a corresponding detection signal;

operating means for producing an interruption signal when recording of the data on the disc by the recording means is interrupted; and control means supplied with the interruption signal and the detection signal for controlling the recording means, the control means producing the management data using the address information of the disc according to the detection signal and controlling the recording means to record the management data in the management data area of the disc, wherein when the control means is supplied with the interruption signal, if the data being recorded at that time is not sufficient to complete a unit, that data is combined with a predetermined amount of data sufficing to complete the unit and the completed unit is recorded on the disc by the recording means, and the control means produces the management data according to the interruption signal and controls the recording means to record the produced management data in the management data area of the disc.

6. An optical disc recording apparatus according to claim 5, wherein the control means produces the management data including an end address data of the data before the predetermined amount of data is added when the interruption signal is supplied to the control means.

7. An optical disc recording apparatus according to claim 5, wherein the control means controls the recording means to record the produced management data when the disc is ejected from the apparatus.

8. An optical disc recording apparatus according to claim 5, wherein the apparatus further comprises storing means controlled by the control means for storing the produced management data from the control means, and the recording means is supplied with the produced management data readout from the storing means.

9. An optical disc recording apparatus according to claim 5, wherein the predetermined data is data of all ones.

10. An optical disc recording apparatus according to claim 5, wherein the predetermined data is data of all zeros.

11. An optical disc recording apparatus according to claim 5, wherein the unit of data is formed of clusters of 32 data sectors and 4 linking sectors, each sector having 2352 bytes of data.

12. An apparatus for adjusting the position of a breakpoint of audio data recorded on a disc in units of the data, each unit being composed of a predetermined amount of the data, the disc having address information corresponding to a recorded position on the disc of each breakpoint of the audio data recorded thereon, the apparatus comprising:

adjusting means for adjusting the position of the breakpoint of data changing the address data;

detection means for detecting whether or not the audio data preceding and subsequent to the breakpoint are recorded temporally continuously;

control means for controlling the adjustment means, when audio data preceding and subsequent to the breakpoint are detected to be temporally discontinuous by the detection means, such that the changing of the address information by the adjusting means in a direction to produce a temporal discontinuity becomes impossible, wherein if the amount of the audio data is not sufficient to complete a unit of data when recording of the data on the disc is interrupted, the control means adds a predetermined data to the audio data sufficing to complete the unit of data, and the adjusting means detects the changing of the address information when the audio data added with the predetermined data is recorded on the disc.

* * * * *